(12) United States Patent
Mackenzie

(10) Patent No.: US 12,739,717 B2
(45) Date of Patent: Sep. 15, 2026

(54) CELLULAR TELECOMMUNICATIONS NETWORK

(71) Applicant: BRITISH TELECOMMUNICATIONS PUBLIC LIMITED COMPANY, London (GB)

(72) Inventor: Richard Mackenzie, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 415 days.

(21) Appl. No.: 18/002,160

(22) PCT Filed: May 11, 2021

(86) PCT No.: PCT/EP2021/062479
§ 371 (c)(1),
(2) Date: Dec. 16, 2022

(87) PCT Pub. No.: WO2021/254696
PCT Pub. Date: Dec. 23, 2021

(65) Prior Publication Data

US 2023/0232297 A1 Jul. 20, 2023

(30) Foreign Application Priority Data

Jun. 18, 2020 (GB) ...................................... 2009339

(51) Int. Cl.
*H04W 36/08* (2009.01)
*H04W 36/16* (2009.01)

(52) U.S. Cl.
CPC .......... *H04W 36/08* (2013.01); *H04W 36/165* (2013.01)

(58) Field of Classification Search
CPC ............... H04W 36/08; H04W 36/165; H04W 52/0206; H04W 36/22; H04W 16/14; Y02D 30/70
(Continued)

(56) References Cited

U.S. PATENT DOCUMENTS 6,775,780 B1 8/2004 Muttik
7,444,309 B2 10/2008 Branke et al.
(Continued)

FOREIGN PATENT DOCUMENTS

CN 102007801 A 4/2011
CN 102083145 A 6/2011
(Continued)

OTHER PUBLICATIONS

3GPP TR 36.927 V15.0.0 (Jul. 2018), “3rd Generation Partnership Project, Technical Specification Group Radio Access Network; Evolved Universal Terrestrial Radio Access (E-UTRA), Potential solution for energy saving for E-UTRAN (Release 15),” 650 Route des Luciales—Sophia Antipolis Valbonne—France, 22 pages.
(Continued)

*Primary Examiner* — Marcos Batista
(74) *Attorney, Agent, or Firm* — EIP US LLP

(57) ABSTRACT

This disclosure provides a method in a cellular telecommunications network, wherein the cellular telecommunications network includes a first transceiver providing a first access connection in a first spectrum range, and a second transceiver providing a second access connection in a second spectrum range, the method including determining that a trigger condition for reconfiguring the second transceiver has been met; and, in response, evaluating a plurality of candidate transition options, wherein each transition option includes transferring users from the second spectrum range to the first access connection, and, following the transfer-
(Continued)

ring, reconfiguring the second transceiver, wherein the evaluation is based on a user impact of the transition; selecting a transition option based on the evaluation; causing the transfer of users from the second spectrum range according to the selected transition option; and causing the reconfiguration of the second transceiver according to the selected transition option.

11 Claims, 4 Drawing Sheets

(58) Field of Classification Search
USPC .................................. 455/436–437; 370/338
See application file for complete search history.

(56) References Cited

U.S. PATENT DOCUMENTS 7,656,799 B2 2/2010 Samuels et al.
7,890,941 B1 2/2011 Garud et al.
8,554,224 B2 10/2013 Soliman et al.
8,903,402 B2 12/2014 Guo et al.
9,141,796 B2 9/2015 Kim et al.
9,215,629 B2 12/2015 Hapsari et al.
9,301,105 B2 3/2016 Kim et al.
9,392,420 B2 7/2016 Fodor et al.
9,439,137 B2 9/2016 Kim et al.
9,462,546 B2 10/2016 Ohta et al.
9,615,318 B2 4/2017 Morper et al.
9,621,571 B2 4/2017 Kim et al.
9,659,176 B1 5/2017 Roter et al.
9,961,687 B2 5/2018 Kashiwase et al.
9,998,982 B2 6/2018 Horn et al.
10,057,743 B2 8/2018 Jabara et al.
10,104,110 B2 10/2018 Oliphant et al.
10,194,474 B2 1/2019 Fitch et al.
10,362,555 B2 7/2019 Briggs et al.
10,405,280 B2 9/2019 Mackenzie et al.
10,462,846 B2 10/2019 Morrill et al.
10,498,502 B2 12/2019 Mildh et al.
10,575,305 B2 2/2020 Webb et al.
10,728,844 B2 7/2020 Mackenzie et al.
10,848,965 B1 11/2020 Budhathoki et al.
10,863,360 B2 12/2020 Mackenzie et al.
11,176,251 B1 11/2021 Plantenga et al.
11,354,409 B1 6/2022 Kenefick
11,470,548 B2 10/2022 Mackenzie et al.
11,556,640 B1 1/2023 Tully et al.
11,558,854 B2 1/2023 Diaz
11,604,153 B2 3/2023 Liu et al.
11,683,752 B2 6/2023 Mackenzie et al.
12,277,221 B2 4/2025 El-Moussa
12,323,901 B2 6/2025 Mackenzie et al.
2005/0187740 A1 8/2005 Marinescu
2007/0300298 A1 12/2007 Goranson et al.
2008/0102896 A1 5/2008 Wang et al.
2009/0126017 A1 5/2009 Chahal
2009/0219888 A1 9/2009 Chen et al.
2010/0120447 A1 5/2010 Anderson et al.
2010/0157911 A1 6/2010 Hegde et al.
2010/0178912 A1 7/2010 Gunnarsson et al.
2010/0227623 A1 9/2010 De Pasquale et al.
2010/0257146 A1 10/2010 Memon et al.
2011/0044251 A1 2/2011 Tamura et al.
2011/0190027 A1 8/2011 Michel et al.
2011/0274030 A1 11/2011 Wang et al.
2012/0002537 A1 1/2012 Bao et al.
2012/0026865 A1 2/2012 Fan et al.
2012/0079596 A1 3/2012 Thomas et al.
2012/0108245 A1 5/2012 Zhang et al.
2012/0157095 A1 6/2012 Fodor et al.
2012/0236828 A1 9/2012 Hapsari et al.
2012/0244869 A1 9/2012 Song et al.
2012/0257495 A1 10/2012 Schwarz et al.
2012/0264418 A1 10/2012 Lee et al.
2012/0275315 A1 11/2012 Schlangen et al.
2012/0329449 A1 12/2012 Das et al.
2013/0005340 A1 1/2013 Drazynski et al.
2013/0035033 A1 2/2013 Sanneck et al.
2013/0084873 A1 4/2013 Sharony et al.
2013/0095842 A1 4/2013 Jia et al.
2013/0130670 A1 5/2013 Samdanis et al.
2013/0150044 A1 6/2013 Zhang et al.
2013/0170435 A1 7/2013 Dinan
2013/0242720 A1 9/2013 Chou
2013/0252622 A1 9/2013 Kobayashi
2013/0260768 A1 10/2013 Guo et al.
2014/0018057 A1 1/2014 Yu et al.
2014/0038593 A1 2/2014 Kim et al.
2014/0050135 A1 2/2014 Zhang et al.
2014/0051437 A1 2/2014 Diachina et al.
2014/0071891 A1 3/2014 Zhou et al.
2014/0071943 A1 3/2014 Lee et al.
2014/0092765 A1 4/2014 Agarwal et al.
2014/0123280 A1 5/2014 Kedma et al.
2014/0126562 A1 5/2014 Gunnarsson et al.
2014/0187234 A1 7/2014 Chou
2014/0187236 A1 7/2014 Chiang et al.
2014/0194110 A1 7/2014 Suerbaum et al.
2014/0269547 A1 9/2014 Valliappan et al.
2014/0286218 A1 9/2014 Park et al.
2014/0364114 A1 12/2014 Zhao
2015/0063136 A1 3/2015 Shen et al.
2015/0067763 A1 3/2015 Dalcher et al.
2015/0092552 A1 4/2015 Baj et al.
2015/0131524 A1 5/2015 Cavalcante et al.
2015/0140955 A1 5/2015 Chakraborty et al.
2015/0271714 A1 9/2015 Shetigar et al.
2015/0281974 A1 10/2015 Ghasemzadeh et al.
2015/0289141 A1 10/2015 Ghasemzadeh et al.
2015/0312769 A1 10/2015 Shindo
2015/0319658 A1 11/2015 Padden et al.
2015/0358892 A1 12/2015 Pandey et al.
2015/0358940 A1 12/2015 Zhang et al.
2016/0014661 A1 1/2016 Choi et al.
2016/0057159 A1 2/2016 Mn et al.
2016/0057699 A1 2/2016 Jang
2016/0088493 A1 3/2016 Byun et al.
2016/0094424 A1 3/2016 Niestemski et al.
2016/0100451 A1 4/2016 Wass et al.
2016/0150420 A1 5/2016 Byun et al.
2016/0174149 A1 6/2016 Byun et al.
2016/0179546 A1 6/2016 Yamada et al.
2016/0192177 A1 6/2016 Kim et al.
2016/0219504 A1 7/2016 Cho et al.
2016/0255529 A1 9/2016 Zhang et al.
2016/0295357 A1 10/2016 Grayson et al.
2016/0321089 A1 11/2016 Sandlin et al.
2016/0323931 A1 11/2016 Huang et al.
2016/0379136 A1 12/2016 Chen et al.
2017/0041098 A1 2/2017 Saghir et al.
2017/0055186 A1 2/2017 Donepudi et al.
2017/0055193 A1 2/2017 Mueck et al.
2017/0064557 A1 3/2017 Alsohaily et al.
2017/0083703 A1 3/2017 Abbasi et al.
2017/0086181 A1 3/2017 Briggs
2017/0171256 A1 6/2017 Liang et al.
2017/0187607 A1 6/2017 Shaikh et al.
2017/0215191 A1 7/2017 Martin
2017/0289904 A1 10/2017 Li
2017/0303188 A1 10/2017 Fitch et al.
2017/0311255 A1 10/2017 Hessler et al.
2017/0318526 A1 11/2017 Wang et al.
2017/0359731 A1 12/2017 Soldati et al.
2018/0027582 A1 1/2018 Yerramalli et al.
2018/0049098 A1 2/2018 Ueda
2018/0097826 A1 4/2018 Luan et al.
2018/0146475 A1 5/2018 Mitsui et al.
2018/0152469 A1 5/2018 Smith et al.
2018/0219735 A1 8/2018 Di-Cairano-Gilfedder et al.
2018/0262922 A1 9/2018 Mackenzie et al.
2018/0324676 A1 11/2018 Huang et al.
2018/0357413 A1 12/2018 Rivera
2018/0376327 A1 12/2018 Sivavakeesar

(56) References Cited

U.S. PATENT DOCUMENTS

2019/0043350 A1 2/2019 Rosales et al.
2019/0121978 A1 4/2019 Kraemer et al.
2019/0159048 A1 5/2019 Feldkamp
2019/0191305 A1 6/2019 Dowlatkhah et al.
2019/0313329 A1 10/2019 Mackenzie et al.
2019/0394704 A1 12/2019 Lou et al.
2019/0394706 A1 12/2019 Phan et al.
2019/0394707 A1 12/2019 Wong et al.
2020/0026854 A1 1/2020 Guo et al.
2020/0037285 A1 1/2020 Sivavakeesar et al.
2020/0154332 A1 5/2020 Tsuda et al.
2020/0154516 A1 5/2020 Gambhir et al.
2020/0159917 A1 5/2020 Cervantez
2020/0174850 A1 6/2020 Sambotin et al.
2020/0244547 A1 7/2020 Uppili
2020/0329428 A1 10/2020 Chou et al.
2021/0326439 A1 10/2021 Hoang et al.
2022/0244953 A1 8/2022 Ji et al.
2023/0023229 A1 1/2023 Kumar et al.
2023/0216744 A1 7/2023 Roscoe et al.
2023/0224720 A1 7/2023 Mackenzie
2023/0232297 A1 7/2023 Mackenzie
2023/0239785 A1 7/2023 Fripp et al.
2023/0274000 A1 8/2023 El-Moussa
2023/0297671 A1 9/2023 El-Moussa

FOREIGN PATENT DOCUMENTS

CN 102149101 A 8/2011
CN 102612842 A 7/2012
CN 102695251 A 9/2012
CN 102695253 A 9/2012
CN 102883378 A 1/2013
CN 103024880 A 4/2013
CN 103249111 A 8/2013
CN 103392360 A 11/2013
CN 103906203 A 7/2014
CN 104113897 A 10/2014
CN 104469830 A 3/2015
CN 104885494 A 9/2015
CN 104969625 A 10/2015
CN 105144768 A 12/2015
CN 105323830 A 2/2016
CN 105611554 A 5/2016
CN 102595564 B 8/2016
CN 104469830 B 10/2017
CN 107409316 A 11/2017
CN 110431860 A 11/2019
CN 110719593 A 1/2020
EP 2154917 A1 2/2010
EP 2203011 A1 6/2010
EP 2271142 A1 1/2011
EP 2375807 A1 10/2011
EP 2533571 A1 12/2012
EP 2663131 A1 11/2013
EP 2806694 A1 11/2014
EP 2814279 A1 12/2014
EP 2916584 A1 9/2015
EP 2928225 A1 10/2015
EP 2975886 A1 1/2016
EP 3065438 A1 9/2016
EP 2975886 B1 8/2018
EP 3224959 B1 2/2019
EP 3472994 A1 4/2019
EP 3474176 A1 4/2019
EP 3472994 B1 10/2020
GB 2542620 A 3/2017
GB 2547943 A 9/2017
GB 2554543 A * 4/2018 .......... H04W 36/165
GB 2554544 A 4/2018
GB 2548796 B 7/2018
GB 2554451 B 2/2019
GB 2554453 B 3/2019
GB 2554543 B 3/2019
GB 2554544 B 3/2019
GB 2564427 B 1/2020
GB 2576555 A 2/2020
GB 2579042 A 6/2020
JP 2010508761 A 3/2010
JP 2013201576 A 10/2013
JP 2015130644 A 7/2015
JP 2015192252 A 11/2015
JP 2016519553 A 6/2016
KR 101907681 B1 10/2018
WO 2008054668 A2 5/2008
WO 2009022976 A1 2/2009
WO 2010024743 A1 3/2010
WO 2011028158 A1 3/2011
WO 2011056023 A2 5/2011
WO 2012138125 A2 10/2012
WO 2012148442 A1 11/2012
WO 2013022505 A1 2/2013
WO 2013071813 A1 5/2013
WO 2013120274 A1 8/2013
WO 2013142361 A1 9/2013
WO 2013167335 A1 11/2013
WO WO-2014111806 A1 7/2014
WO 2014161896 A1 10/2014
WO WO-2014175919 A1 10/2014
WO 2015006047 A1 1/2015
WO 2015019317 A1 2/2015
WO WO-2015020479 A1 2/2015
WO 2015034775 A1 3/2015
WO WO-2015060172 A1 4/2015
WO WO-2015062060 A1 5/2015
WO 2015104552 A1 7/2015
WO 2015134985 A1 9/2015
WO WO-2016056964 A1 4/2016
WO 2016118145 A1 7/2016
WO 2016151653 A1 9/2016
WO WO-2016134676 A1 9/2016
WO 2016185946 A1 11/2016
WO 2017003580 A1 1/2017
WO WO-2018059858 A1 4/2018
WO WO-2018111166 A1 6/2018
WO 2019226173 A1 11/2019
WO 2020038676 A1 2/2020
WO WO-2020098640 A1 5/2020
WO WO-2020098985 A1 5/2020

OTHER PUBLICATIONS

3GPP TS 24.301 V17.2.0, "3rd Generation Partnership Project; Technical Specification Group Core Network and Terminals; Non-Access-Stratum (NAS) protocol for Evolved Packet System (EPS); Stage 3 (Release 17)," Technical Specification, (Mar. 2021), 588 pages.
3GPP TS 32.551 V15.0.0 (Jun. 2018), "3rd Generation Partnership Project, Technical Specification Group Services and System Aspects, Concepts and requirements; Telecommunication management, Energy Saving Management (ESM)," (Release 15), 650 Route des Luciales—Sophia Antipolis Val bonne—France, 26 pages.
3GPP TS 36.300 V16.1.0 (Mar. 2020), " 3rd Generation Partnership Project, Technical Specification Group Radio Access Network, Evolved Universal Terrestrial Radio Access (E-UTRA) and Evolved Universal Terrestrial Radio Access Network (E-UTRAN)," Overall description, stage 2, (Release 16), 387 pages.
Annex to the Commission implementing regulation, specifying the characteristics of small-area wireless access points pursuant to Article 57(2) of Directive (EU) 2018/1972 of the European Parliament and the Council establishing the European Electronic Communications Code, Feb. 27, 2020, 2 pages.
Barakat B., et al., "Energy Efficient Carrier Aggregation for LTE Advanced," Proceedings of the 8th IEEE GCC Conference and Exhibition, Muscat, Oman, Feb. 1-4, 2015, 5 pages.
Chavarria-Reyes E., et al., "Energy-Efficient Multi-Stream Carrier Aggregation for Heterogeneous Networks in 5G Wireless Systems," IEEE Transactions on Wireless Communications, vol. 15, No. 11, Nov. 2016, pp. 7432-7443.
Combined Search and Examination Report under Section 17 and 18(3) for GB Application No. 2009306.8, mailed on Nov. 16, 2020, 5 pages.

(56) References Cited

OTHER PUBLICATIONS

Combined Search and Examination Report under Section 17 and 18(3) for GB Application No. 2009328.2, mailed on Dec. 1, 2020, 5 pages.
Combined Search and Examination Report under Section 17 and 18(3) for GB Application No. 2009339.9, mailed on Dec. 15, 2020, 7 pages.
European Search Report for Application No. 21173324.1, mailed on Jun. 17, 2022, 10 pages.
Examination Report under Section 18(3) for GB Application No. 2009328.2, mailed on Oct. 18, 2022, 3 pages.
Examination Report under Section 18(3) for GB Application No. 2009328.2, mailed on Jul. 20, 2022, 3 pages.
Extended European Search Report for Application No. 21173324.1, mailed on Oct. 29, 2021, 10 pages.
First Office Action mailed Apr. 26, 2022 for Japanese Application No. 2021-099329 filed Jun. 15, 2021, 5 pages.
GSM Association, GSM Association, GSMA Floor2 Thewalbrook Building 25 Wallbrook London, UK, Apr. 22, 2013 (Apr. 22, 2013), XP040674838.
GSMA "Infrastructure Sharing: An Overview," last updated Jun. 18, 2019, Retrieved from https://www.gsma.com/futurenetworks/wiki/infrastructure-sharing-an-overview/, 18 pages.
International Preliminary Report on Patentability for Application No. PCT/EP2021/062478, mailed on Sep. 26, 2022, 35 pages.
International Preliminary Report on Patentability for Application No. PCT/EP2021/062479, mailed on Sep. 23, 2022, 27 pages.
International Preliminary Report on Patentability for Application No. PCT/EP2021/066406, mailed on Aug. 30, 2022, 20 pages.
International Search Report and Written Opinion for Application No. PCT/EP2021/062478, mailed on Aug. 25, 2021, 23 pages.
International Search Report and Written Opinion for Application No. PCT/EP2021/062479, mailed on Jul. 22, 2021, 21 pages.
International Search Report and Written Opinion for Application No. PCT/EP2021/066406, mailed on Oct. 14, 2021, 16 pages.
Jots NHIB Specification, "Joint Operator Technical Specification of the neutral host in-building solution Annex 1 Architecture (v0.11)," 57 pages.
Kumar S.S., et al., "Energy Efficient Rate Coverage with Base Station Switching and Load Sharing in Cellular Networks," 2016 8th International Conference on Communication Systems and Networks (COMSNETS), 2016, 6 pages.
Morris D., JOTS Neutral Host In-Building, Sep. 17, 2019, 16 pages.
Opadere J., et al., "Energy-Efficient Virtual Radio Access Networks for Multi-Operators Cooperative Cellular Networks," IEEE Transactions on Green Communications and Networking, vol. 3, No. 3, Sep. 2019, pp. 603-614.
Opadere J., et al. "Energy-Efficient RRH Sleep Mode for VirtualRadio Access Networks," IEEE, 2017, 6 pages.
Search Report under Section 17 for GB Application No. 2009312.6, mailed Nov. 23, 2020, 4 pages.
Written Opinion of the International Preliminary Examination for Application No. PCT/EP2021/062478, mailed on Jun. 22, 2022, 15 pages.
Written Opinion of the International Preliminary Examination for Application No. PCT/EP2021/066406, mailed on Jun. 9, 2022, 10 pages.
Written Opinion of the International Preliminary Examining Authority for Application No. PCT/EP2021/062479, mailed on Jun. 17, 2022, 10 pages.
"Recommended Practices for multi-vendor SON deployment", NGMN the engine of broadband wireless innovation Deliverable D2 Version 1.0 by NGNM Alliance; Reading Bridge House George Street Reading Berkshire RG 1 8LS Uk, Jan. 28, 2014, 30 pages.
"Small Cell Forum Release 9.0; Document 176.09.01 LTE small cell SON test cases: Functionality and interworking; version 176.09.01", Feb. 21, 2017, 95 pages.
3GPP, "Issues on X2-GW deployment", 3rd Generation Partnership Project (3GPP), 3GPP TSG-RAN3 Meeting #79bis, R3-130571, Apr. 2013, 6 pages.
3GPP 36.420 v8.0.0 (Dec. 2007), "X2 general aspects and principals; Technical Specification; 3 Generation Partnership Project (Dec. 2007)", http://www.mc.ioi3GPP/Specs/36420-800.pdf, Dec. 2007, 11 pages.
3GPP TR 24.826 V11.0.0 (Jun. 2011), "3rd Generation Partnership Project; Technical Specification Group Core Network and Terminals; Study on impacts on signaling between User Equipment (UE) and core network from energy saving (Release 11)", 650 Route des Luciales—Sophia Antipolis Valbonne—France, 2011, 33 pages.
3GPP TR 32.816 V8.0.0 (Dec. 2008), "3rd Generation Partnership Project; Technical Specification Group Services and System Aspects; Telecommunication Management; Study on Management of Evolved Universal Terrestrial Radio Access Network (E-Utran) and Evolved Packet", 650 Route des Luciales—Sophia Antipolis Valbonne—France, Dec. 2008, 38 pages.
3GPP TR 36.942 V9.3.0, "Technical Specification Group Radio Access Network; Evolved Universal Terrestrial Radio Access (E-UTRA)", 3rd Generation Partnership Project; Radio Frequency (RF) system scenarios (Release 9), Jun. 2012, 83 pages.
3GPP TS 24.301 V16.8.0 (Mar. 2021), "3rd Generation Partnership Project Technical Specification Group Core Network and Terminals; Non-Access-Stratum (NAS) protocol for Evolved Packet System (EPS); Stage 3 (Release 16)", 2021, 586 pages.
3GPP TS 36.300 V11.6.0 (Jun. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 650 Route des Luciales—Sophia Antipolis Valbonne—France, 2013, 209 pages.
3GPP TS 36.300 V13.3.0 (Mar. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN)' Overall description; Stage 2 (Release 13)", 650 Route des Luciales—Sophia Antipolis Valbonne—France, 2016, 295 pages.
3GPP TS 36.300 V14.2.0, "Technical Specification Group Radio Access Network, Evolved Universal Terrestrial Radio Access (E-UTRA) and Evolved Universal Terrestrial Radio Access Network (E-UTRAN)", 3rd Generation Partnership Project, Overall description, Stage 2, Release 14, Mar. 2017, 330 pages.
3GPP TS 36.423 V14.2.0, "Technical Specification Group Radio Access Network, Evolved Universal Terrestrial Radio Access Network (E-UTRAN)", 3rd Generation Partnership Project, X2 application protocol (X2AP), Release 14, Mar. 2017, 242 pages.
ETSI TS 124 301 V16.8.0 (Apr. 2021), ETSI Technical Specification, Universal Mobile Telecommunications System (UMTS), LTE, 5G, Non-Access-Stratum (NAS) protocol for Evolved Packet System (EPS) Stage 3 (3GPP TS 24.301 version 16.8.0 Release 16), Available Online at https://www.etsi.org/deliver/etsi_ts/124300_124399/124301/16.08.00_60/ts_124301v160800p.pdf, 2021, 575 pages.
Ahn, et al., "A Genetic Algorithm for Shortest Path Routing Problem and the Sizing of Populations", IEEE Transactions on Evolutionary Computation, vol. 6, No. 6, Dec. 2002, pp. 566-579.
Alam, et al., "Annotated Control Flow Graph for Metamorphic Malware Detection", The Computer Journal, vol. 58, No. 10, 2014, 14 pages.
Alba, et al., "Solving the Vehicle Routing Problem by Using Cellular Genetic Algorithms", Lecture Notes in Computer Science, Apr. 2004, 11 pages.
Antonopoulos, "Mastering Bitcoin—Unlocking Digital Crypto-Currencies", O'Reilly Media, 2014, 282 pages.
Araujo, et al., "Diversity Through Multiculturality: Assessing Migrant Choice Policies In an Island Model", IEEE Transactions on Evolutionary Computation, vol. 15, No. 4, Aug. 2011, pp. 456-469.
Badotra, et al., "Open Daylight as a Controller for Software Defined Networking", International Journal of Advanced Research in Computer Science, vol. 8, No. 5, May 2017, pp. 1105-1111.
Barbosa, et al., "Access Point Design with a Genetic Algorithm", Sixth International Conference on Genetic and Evolutionary Computing, 2012, pp. 119-123.
Bruschi, et al., "Using Code Normalization for Fighting Self-Mutating Malware", Rapporto Tecnico N. 08-16, Mar. 2006, 14 pages.

(56) References Cited

OTHER PUBLICATIONS

Carlson, et al., "Scheduling to Minimize Interaction Cost", The Johns Hopkins University, Baltimore, Maryland, Jun. 2, 1965, 8 pages.
Chen, et al., "Analysis of Ant Colony Algorithm for Finding the Optimal Circuitous Route in the Communication Network of Power System", 5th International Conference on Electric Utility Deregulation and Restructuring and Power Technologies, Nov. 26-29, 2015, pp. 2532-2535.
Codan Radio, "RF Link Controlled Base Station", Codan Radio Communications https://www.codanradio.com/nroduct/rf-link-controlled-base [retrieved on Oct. 3, 2018], Aug. 8, 2017, 2 pages.
Erickson, "The Beacon OpenFlow Controller", HotSDN '13, Proceedings of the second Acm Sigcomm workshop on Hot topics in software defined networking, Aug. 16, 2013, 6 pages.
Eskandari, et al., "A Graph Mining Approach for Detecting Unknown Malwares", Journal of Visual Languages & Computing, vol. 23, No. 3, 2012, pp. 154-162.
ETSI TR 136 927 V13.0.0 (Jan. 2016), "Technical Report LTE; Evolved Universal Terrestrial Radio Access (E-UTRA); Potential solutions for energy saving for Eutran (3GPP TR 36.927 version 13.0.0 Release 13)", 650 Route des Luciales—Sophia Antipolis Valbonne—FRANCE, 26 pages.
ETSI TS 132 551 V13.0.0 (Feb. 2016), "Technical Specification Universal Mobile Telecommunications System (Umts); Lte; Telecommunication management; Energy Saving Management (ESM); Concepts and requirement (3GPP TS 32.551 version 13.0.0 Release 13)", 650 Route des Luciales—Sophia Antipolis Valbonne—France, 28 pages.
Fairbrother, et al., "A Two-Level Graph Partitioning Problem Arising in Mobile Wireless Communications", arXiv: 1705.08773v1 [math.QC], May 24, 2017, 23 pages.
Ghaddar, et al., "A branch-and-cut algorithm based on semidefinite programming for the minimum k-parition problem", Ann Oper Res DOI 10 1007/s10479-008-0481-4, Springer Science+Business Media, LLC 2008, Dec. 3, 2008, 20 pages.
Gill, et al., Transformative Effects of IoT, Blockchain and Artificial Intelligence on Cloud Computing: Evolution, Vision, Trends and Open Challenges:, Cornell University Library, available at https://arxiv.org/ftp/arxiv/papers/1911/1911.01941.pdf, Oct. 19, 2019, 30 pages.
Huawei, "Report of Email Discussion [97bis#19][LTE/FeD2D]-Grouphandover", 3GPP Draft, R2-1705300, 3rd Generation Partnership Project (3GPP), 3GPP TSG RAN WG2#98, Hangzhou, China, May 15-19, 2017, 18 pages.
Kang, et al., "Malware Classification Method via Binary Content Comparison", RACS '12: Proceedings of the 2012 ACM Research in Applied Computation Symposium, 2012, pp. 316-321.
Macqueen, "Some Methods for Classification and Analysis of Multivariate Observations", Fifth Berkeley Symposium, University of California, Los Angeles, 1967, pp. 281-297.
Melanie, "An Introduction to Genetic Algorithms", Fifth Printing, 1999, 162 pages.
Motorola, et al., "Draft CR capturing HeNB inbound mobility agreements", 3GPP Draft; R2-096401 Cr Henb 36_300 Agreements_ V7, 3rd Generation Partnership Project (3GPP), Jeju, Korea XP050391033, Nov. 9, 2009, 4 pages.
Mukhopadhyay, et al., "Novel RSSI Evaluation Models for Accurate Indoor Localization with Sensor Networks", 978-1-4799-2361-8/14, 2014 IEEE, Bharti School of Telecommunication Technology and Management IIT Delhi Hauz Khas, New Delhi, 2014, 6 pages.
New Postcom, "X2 Connection and Routing for X2-GW Deployment", 3GPPDRAFT, R3-130225, 3rd Generation Partnership Project (3GPP), 3GPP TSG RAN WG3 Meeting #79, St. Julian's, Malta, Jan. 28-Feb. 1, 2013, 3 pages.
Ning, et al., "Fuzzy layered physical cell identities assignment in heterogeneous and small cell networks", Electronics Letters, vol. 52, No. 10, May 12, 2016, 2 pages.
Nokia Siemens Networks, "X2 Interface Proxy at DeNB", R3-101662, 3rd Generation Partnership Project(3GPP), 3GPP TSG-RAN WG Meeting #70, Montreal, Canada, May 2010, 5 pages.
Qualcomm Europe, et al., "QoS principles for CSG members and nonmembers at hybrid access mode HeNBs", 3GPP Draft; R3-091022, 3rd Generation Partnership Project (3GPP), San Francisco, US XP050341407, May 4-8, 2009, 4 pages.
Qualcomm Europe, "QoS support for hybrid CSG cells", 3GPP Draft; R3-091454, 3rd Generation Partnership Project (3GPP), San Francisco, US; XP050341776., May 4, 2009, 3 pages.
Qualcomm Technologies, Inc, "LTE Small Cell SON Test Cases, Functionality and Interworking", San Diego, CA, USA, Jun. 5, 2015, 82 Pages.
Rendl, F, "Semidefinite Relaxations for Partitioning, Assignment and Ordering Problems", Cross Mark, Ann Oper Res (2016) 240 119-140 DOI 101007/s10479-015- 2015-1; Springer Science+ Business Media New York 2015, Sep. 15, 2015, 22 pages.
Web article, "Dsdp", Neos Interfaces to DSDP, Jul. 3, 2017, 4 pages.
Web article, "Welcome to CVXPY", Welcome to CVXPY—CVXPY 0.4.9 documentation, Jul. 3, 2017, 1 page.
Wu, et al., "Physical Cell Identity Self-Organization for Home eNodeB Deployment in LTE", Hai Jiang Yi, Nokia Siemens Networks, 978-1-4244-3709-2/10, IEEE, Beijing China, 2010, 6 pages.
Younis, et al., "Cognitive MANET Design for Mission-Critical Networks", Military Communications; IEEE Communications Magazine, 0163-6804/09 2009 IEEE, Oct. 2009, 5 pages.
Zhang, et al., "Distributed Hash Table Theory, Platforms and Applications", Springer Briefs in Computer Science, 2013, pp. 1-73.
Zhong, et al., "A Malware Classification Method based on Similarity of Function Structure", IEEE/IPSJ 12th International Symposium on Applications and the Internet, IEEE Computer Society, 2012, pp. 256-261.
EP Exam Report for EP21735204.6 dated Jul. 8, 2026, 9 pages.

* cited by examiner

Legend

Normal (active) mode

Compensation mode

Energy saving mode

Legend

Normal (active) mode

Compensation mode

Energy saving mode

CELLULAR TELECOMMUNICATIONS NETWORK

PRIORITY CLAIM

The present application is a National Phase entry of PCT Application No. PCT/EP2021/062479, filed May 11, 2021, which claims priority from GB Patent Application No. 2009339.9, filed Jun. 18, 2020, each of which is hereby fully incorporated herein by reference.

TECHNICAL FIELD

The present disclosure relates to a cellular telecommunications network.

BACKGROUND

A cellular telecommunications network includes a base station providing voice and data services to a plurality of User Equipment (UE) via wireless communications. The base station is (at least in part) located at a cell site, which further includes supporting infrastructure (such as a power supply) for operating the base station. In traditional architectures, the cell site and base station are owned and operated by a single Mobile Network Operator (MNO) and the base station connects solely to that MNO's core network. The base station typically includes an antenna support (e.g. a mast, an antenna frame or rooftop attachment), one or more antennae and one or more controllers (e.g. a Radio Network Controller (RNC)).

There are several ways in which MNOs may cooperate to share infrastructure. The most basic example of shared MNO infrastructure, known as site sharing, is where the physical cell site is shared between MNOs but each MNO maintains ownership and control of the base station equipment (e.g. mast, antenna and controller). The base station supporting equipment (e.g. power supply) may or may not be shared between the MNOs in a site sharing arrangement. In a further example of shared MNO infrastructure, known as mast sharing, the base station's mast (or equivalent antenna support) is shared between MNOs, but each MNO maintains ownership and control of the remaining base station equipment (the antennae and controllers). Again, the base station supporting equipment (e.g. power supply) may or may not be shared between the MNOs in a mast sharing arrangement.

A more comprehensive form of shared MNO infrastructure is known as a Multi-Operator Radio Access Network (MORAN) in which the cell site, base station equipment and base station supporting equipment are shared between MNOs. The base station equipment must be configured to communicate with UEs of all MNOs, such as by transmitting each operator's Public Land Mobile Network (PLMN) identifier in the respective signals, but must communicate within each MNO's dedicated spectrum range. The base station equipment must also be configured to direct traffic to the appropriate MNO's core network. A similar arrangement is known as Multi-Operator Core Network (MOCN), in which the cell site, base station equipment and base station supporting equipment are again shared between MNOs and may also use shared spectrum ranges for communications with UEs of different MNOs.

A further alternative to shared infrastructure is where the cell site, base station and base station supporting equipment are owned and/or managed by a 3$^{rd}$ party, and one or more MNOs operate on the 3$^{rd}$ party's infrastructure. This is known as a "neutral host".

A challenge in modern cellular telecommunications network is for MNOs to meet energy efficiency targets. These targets may create a downward pressure on the maximum capacity and coverage an MNO's base station may offer. To address this concern, energy saving mechanisms were introduced which allow a base station to enter an energy saving mode (where most if not all operations are suspended). To ensure continuity of service to UE previously served by the energy saving base station, the UE may be transferred to one or more neighboring base stations. The neighboring base station may alter its coverage area in order to provide service.

Some forms of base station reconfiguration, such as when switching from MORAN to MOCN mode, require a period of service interruption during which users receive poor service or no service at all. This may involve the base station rebooting. This may deter mobile network operators from implementing changes in their networks.

SUMMARY

According to a first aspect of the disclosure, there is provided a method in a cellular telecommunications network, wherein the cellular telecommunications network includes a first transceiver providing a first access connection in a first spectrum range, and a second transceiver providing a second access connection in a second spectrum range, the method comprising: determining that a trigger condition for reconfiguring the second transceiver has been met; and, in response, evaluating a plurality of candidate transition options, wherein each transition option includes: transferring users from the second spectrum range to the first access connection, and, following the transferring, reconfiguring the second transceiver, wherein the evaluation is based on a user impact of the transition; selecting a transition option based on the evaluation; causing the transfer of users from the second spectrum range according to the selected transition option; and causing the reconfiguration of the second transceiver according to the selected transition option.

According to a second aspect of the disclosure, there is provided a computer program comprising instructions which, when the program is executed by a computer, cause the computer to carry out the method of the first aspect of the disclosure.

According to a third aspect of the disclosure, there is provided a network node having a processor configured to carry out the method of the first aspect of the disclosure.

BRIEF DESCRIPTION OF THE DRAWINGS

In order that the present disclosure may be better understood, embodiments thereof will now be described, by way of example only, with reference to the accompanying drawings in which.

DETAILED DESCRIPTION

Figure 1:
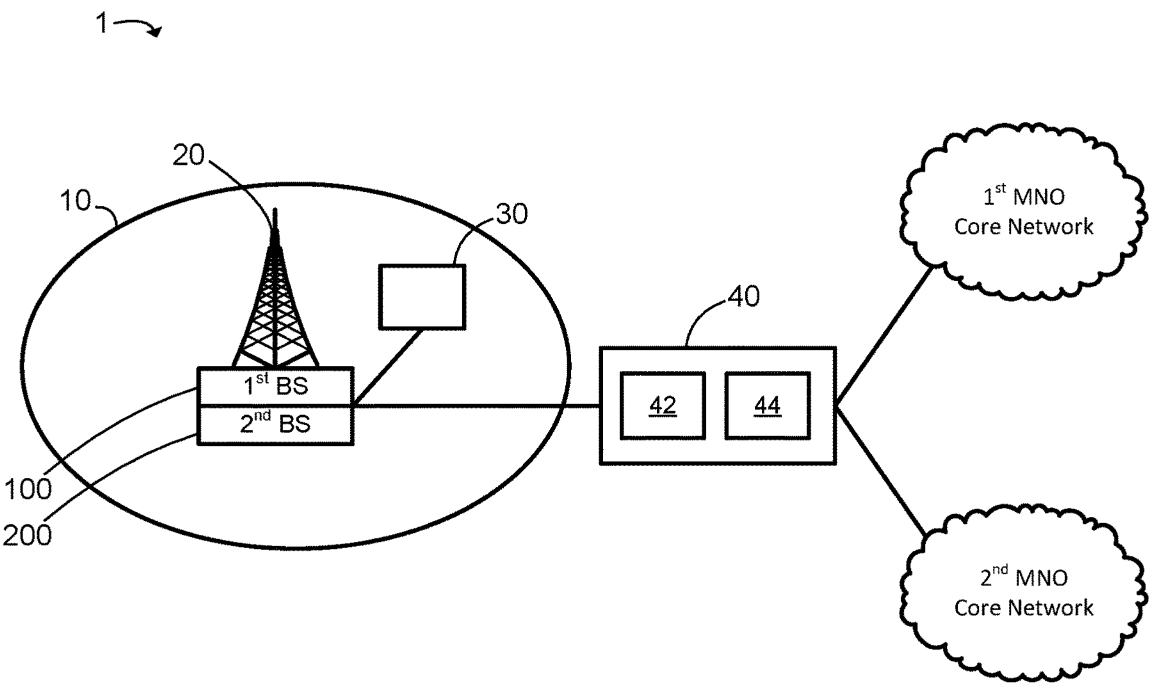
FIG. 1 is a schematic diagram of an embodiment of a cellular telecommunications network of the present disclosure.

A first embodiment of a cellular telecommunications network 1 will now be described with reference to FIG. 1. FIG. 1 illustrates a cell site 10 including a mast 20 and base station support equipment 30 (shown as a single unit, but may comprise several components such as a power supply, cooling unit, etc.). The cell site 10, mast 20 and base station supporting equipment 30 are shared by a first Mobile Network Operator (MNO) and second MNO. The first MNO deploys a first base station 100 at the cell site, such that one or more transceivers are positioned on the mast 20 and any processing equipment is located in the cell site 10 (and may utilize the base station supporting equipment 30). The second MNO also deploys a second base station 200 at the cell site 10, such that one or more transceivers for the second base station 200 are positioned on the mast 20 and any processing equipment is located in the cell site 10 (again, this may utilize the base station supporting equipment 30). The processing equipment of the first and second base stations 100, 200 may operate on dedicated hardware, or may operate in virtualized environments on a common hardware platform.

FIG. 1 also illustrates a neutral host site 40. The neutral host site 40 has a transport connection with the first and second base stations 100, 200, a first backhaul connection with the core network of the first MNO and a second backhaul connection with the core network of the second MNO. These connections are typically optical fiber connections. The neutral host site 40 includes a controller 42 and router 44. The router 44 is responsible for routing traffic for the first base station 100 to/from the core network of the first MNO, and for routing traffic for the second base station 200 to/from the core network of the second MNO. The controller 42 is responsible for the management of shared operations at the cell site and for implementing embodiments of the method of the present disclosure (discussed below).

A first embodiment of a method of the present disclosure will now be described. In overview, a trigger condition is met to reconfigure a serving base station. To avoid service interruption to users currently being served by the serving base station, this embodiment utilizes a multi-carrier target base station that is not operated by the same mobile network operator of the serving base station. Users of the target base station are transferred between carriers so that one carrier is an unused carrier, and this unused carrier is reconfigured to MOCN mode so that it may serve users of both the serving base station's operator and the target base station's operator. Users of the serving base station are then transferred from the serving base station to this unused carrier, so that the serving base station is now free of users and may reconfigure. This embodiment therefore allows the serving base station to reconfigure without any service interruption to the users it previously served or to users of the target base station. A more detailed description follows with reference to FIGS. 2 to 4.

Figure 2:
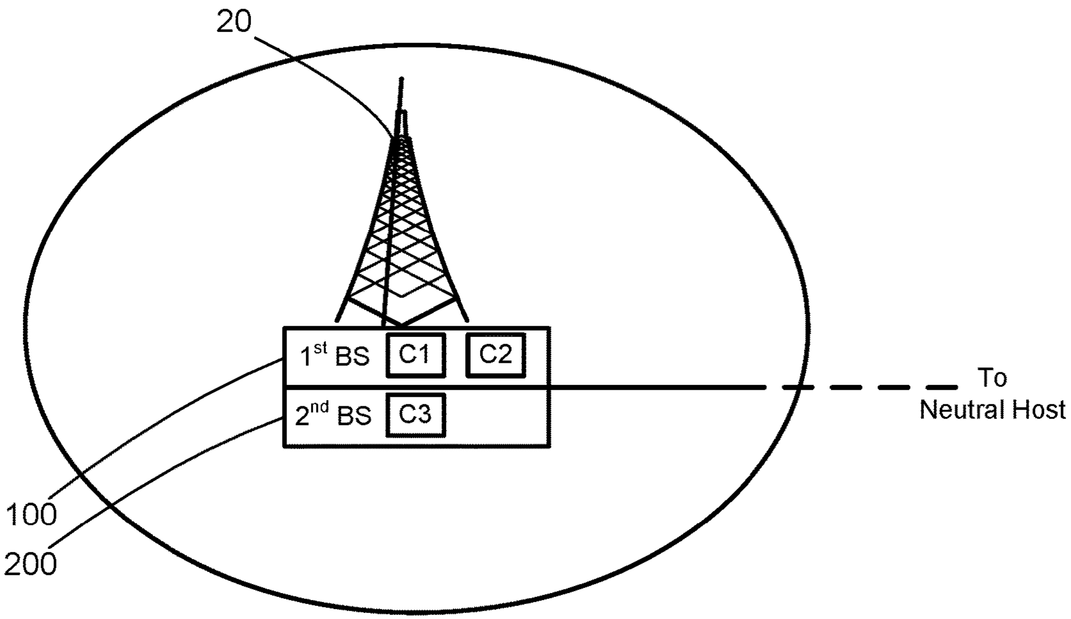
FIG. 2 is a schematic diagram of a cellular telecommunications network implementing the first embodiment of the method of the present disclosure, in a first configuration.

An initial state of the cellular telecommunications network is shown in FIG. 2, in which the cell site includes a first and second base station 100, 200 in a MORAN arrangement, in which the first base station 100 is operated by a first MNO and the second base station 200 is operated by a second MNO. The first base station 100 uses a first and second carrier (C1, C2) and the second base station 200 uses a third carrier (C3). The first, second, and third carriers are distinct, non-overlapping spectrum ranges for communications with UE.

In S101 (as shown in the flow diagram of FIG. 6), the neutral host controller 42 determines that a reconfiguration should be made to the second base station. In this example, the reconfiguration is a switch from normal (active) mode to energy saving mode, although any form of reconfiguration that may cause service interruption to users may be used as a trigger. Furthermore, in this example, the neutral host controller 42 determines that both carriers of the first base station 100 shall compensate for the users of the second base station, which involves a switch from MORAN to MOCN mode so that the first base station 100 is configured to serve users of both the first and second mobile network operators.

In S103, the neutral host controller 42 evaluates a plurality of transition options that facilitates the reconfiguration whilst reducing service interruption to users. In this example, there are six transition options to be evaluated:

1. Option 1:
   a. Transfer users of the first carrier of the first base station 100 to the second carrier of the first base station 100,
   b. Reconfigure the first carrier of the first base station 100 to MOCN mode so that it may communicate with users of the first mobile network operator and users of the second mobile network operator,
   c. Transfer users of the second carrier of the first base station 100 (including those that were transferred in step 1a) to the first carrier of the first base station 100,
   d. Reconfigure the second carrier of the first base station 100 to MOCN mode so that it may communicate with users of the first mobile network operator and users of the second mobile network operator,
   e. Transfer users of the third carrier of the second base station 200 to the first carrier of the first base station 100 and/or second carrier of the first base station 100,
   f. Reconfigure the third carrier of the second base station 200 to switch to energy saving mode.
2. Option 2:
   a. Transfer users of the first carrier of the first base station 100 to the second carrier of the first base station 100,
   b. Reconfigure the first carrier of the first base station 100 to MOCN mode so that it may communicate with users of the first mobile network operator and users of the second mobile network operator,
   c. Transfer users of the third carrier of the second base station 200 to the first carrier of the first base station 100,
   d. Reconfigure the third carrier of the second base station 200 to switch to energy saving mode,
   e. Transfer users of the second carrier of the first base station 100 to the first carrier of the first base station 100,
   f. Reconfigure the second carrier to MOCN mode so that it may communicate with users of the first mobile network operator and users of the second mobile network operator,
   g. Transfer some users of the first carrier of the first base station 100 to the second carrier of the first base station 100.

3. Option 3:
   a. Transfer users of the second carrier of the first base station 100 to the first carrier of the first base station 100,
   b. Reconfigure the second carrier of the first base station 100 to MOCN mode so that it may communicate with users of the first mobile network operator and users of the second mobile network operator,
   c. Transfer users of the first carrier of the first base station 100 (including those that were transitioned in step 3a) to the second carrier of the first base station 100,
   d. Reconfigure the first carrier of the first base station 100 to MOCN mode so that it may communicate with users of the first mobile network operator and users of the second mobile network operator,
   e. Transfer users of the third carrier of the second base station 200 to the first carrier of the first base station 100 and/or second carrier of the first base station 100,
   f. Reconfigure the third carrier of the second base station 200 to switch to energy saving mode.
4. Option 4:
   a. Transfer users of the second carrier of the first base station 100 to the first carrier of the first base station 100,
   b. Reconfigure the second carrier of the first base station 100 to MOCN mode so that it may communicate with users of the first mobile network operator and users of the second mobile network operator,
   c. Transfer users of the third carrier of the second base station 200 to the second carrier of the first base station 100,
   d. Reconfigure the third carrier of the second base station 200 to switch to energy saving mode,
   e. Transfer users of the first carrier of the first base station 100 to the second carrier of the first base station 100,
   f. Reconfigure the first carrier to MOCN mode so that it may communicate with users of the first mobile network operator and users of the second mobile network operator,
   g. Transfer some users of the second carrier of the first base station 100 to the first carrier of the first base station 100.
5. Option 5:
   a. Transfer users of the first carrier of the first base station 100 to the second carrier of the first base station 100,
   b. Reconfigure the first carrier of the first base station 100 to MOCN mode so that it may communicate with users of the first mobile network operator and users of the second mobile network operator,
   c. Transfer users of the third carrier of the second base station 200 to the first carrier of the first base station 100,
   d. Reconfigure the third carrier of the second base station 200 to MOCN mode so that it may communicate with users of the first and second mobile network operator,
   e. Transfer users of the second carrier of the first base station 100 to the third carrier of the second base station 200,
   f. Reconfigure the second carrier of the first base station 100 to MOCN mode so that it may communicate with users of the first mobile network operator and users of the second mobile network operator,
   g. Transfer some users of the first carrier of the first base station 100 to the second carrier of the first base station 100 (i.e. those that were originally served by the second carrier),
   h. Transfer users of the third carrier of the second base station to the first and/or second carrier of the first base station 100,
   i. Reconfigure the third carrier of the second base station 200 to energy saving mode.
6. Option 6:
   a. Transfer users of the second carrier of the first base station 100 to the first carrier of the first base station 100,
   b. Reconfigure the second carrier of the first base station 100 to MOCN mode so that it may communicate with users of the first mobile network operator and users of the second mobile network operator,
   c. Transfer users of the third carrier of the second base station 200 to the second carrier of the first base station 100,
   d. Reconfigure the third carrier of the second base station 200 to MOCN mode so that it may communicate with users of the first and second mobile network operator,
   e. Transfer users of the first carrier of the first base station 100 to the third carrier of the second base station 100,
   f. Reconfigure the first carrier of the first base station 100 to MOCN mode so that it may communicate with users of the first mobile network operator and users of the second mobile network operator,
   g. Transfer some users of the second carrier of the first base station 100 to the first carrier of the first base station 100 (i.e. those that were originally served by the first carrier),
   h. Transfer users of the third carrier of the second base station to the first and/or second carrier of the first base station 100,
   i. Reconfigure the third carrier of the second base station 200 to energy saving mode.

The evaluation calculates a transition score of each option which represents service interruption to users. In this embodiment, the transition score is evaluated as:

$$\text{Transition Score} = \sum_i (1 - H_i)(1 - O_i)(1 - S_i)$$

In which:

i represents a step of an option being evaluated (i.e. the transition score for option 1 is the sum of steps 1a to 1g), H, the 'handover impact' represents a negative impact to users should one or more handovers in step i fail. This may be based on the number of users to be transferred by handover (i.e. all connected mode users) in step i and a historical handover failure rate, O, the 'overload impact' represents a negative impact to users of base station overload should one or more base stations become overloaded during step i. This term may take into consideration how Quality of Service (QoS) metrics decrease due to a carrier being overloaded (i.e. due to a shortage of radio resources to provide a service), or how users are denied handover due to the carrier being overloaded, S, the ‘service impact’ represents a negative impact on service to users following step i. This may be based on certain services not being available following step i.

The handover, overload and service impact may be evaluated and weighted according to each MVO’s policy (for example, handovers for users of the first MNO may be evaluated according to the first MVO’s policy).

The following is noted regarding the transition score of each embodiment above. Generally, options 5 and 6 will have a greater handover impact than options 1 to 4 (as more handovers are involved being subject to the same handover failure rate), but may have a lower overload impact than options 1 to 4. Furthermore, the transition scores of each option will differ based on the particular number of users on each carrier, current load on each carrier, the capacity of each carrier, and the particular services provided by each carrier. With this information, it is possible to evaluate the handover impact at each step, the load for each carrier at each step, and the ability of each carrier to provide the required services at each step.

In S105, the neutral host controller 42 selects a transition option from the plurality of transition options that has the highest transition score, which, in this example, is option 3. The neutral host controller 42 then implements option 3 by sending instruction messages to the first and second base station 100, 200. Accordingly, in S107, the neutral host controller 42 sends an instruction message to the first base station 100 to implement steps 3a to 3d of option 3. In response to this instruction message, in S109, the first base station 100 transfers users of the second carrier of the first base station 100 to the first carrier of the first base station 100, reconfigures the second carrier of the first base station 100 to MOCN mode (so that the first base station 100 begins transmitting the first MNO’s Public Land Mobile Network (PLMN) identifier and the second MNO’s PLMN so that it may communicate with users of the first mobile network operator and users of the second mobile network operator), transfers users of the first carrier of the first base station 100 (including those that were transferred in 3a) to the second carrier of the first base station 100, and reconfigures the first carrier of the first base station 100 to MOCN mode so that it may communicate with users of the first mobile network operator and users of the second mobile network operator.

The first base station 100 then sends a confirmation message to the neutral host controller 42 indicating that steps 3a to 3d are complete. In response, in S111, the neutral host controller 42 sends an instruction message to the second base station 200 to implement steps 3e and 3f of option 3. In response, in S113, the second base station 200 transfers users of the third carrier of the second base station 200 to the first carrier of the first base station 100 and second carrier of the first base station 100 (such that the first and second carrier are compensating for the third carrier), and reconfigures the third carrier of the second base station 200 to switch to energy saving mode. The second base station 200 then sends a confirmation message to the neutral host controller 42 indicating that steps 3e and 3f are complete. In response, in S115, the neutral host controller 42 reconfigures the neutral host router so that any traffic for the second MNO’s users now being served by the first base station 100 is routed between the first base station 100 and the second MNO’s core network.

Figure 3:
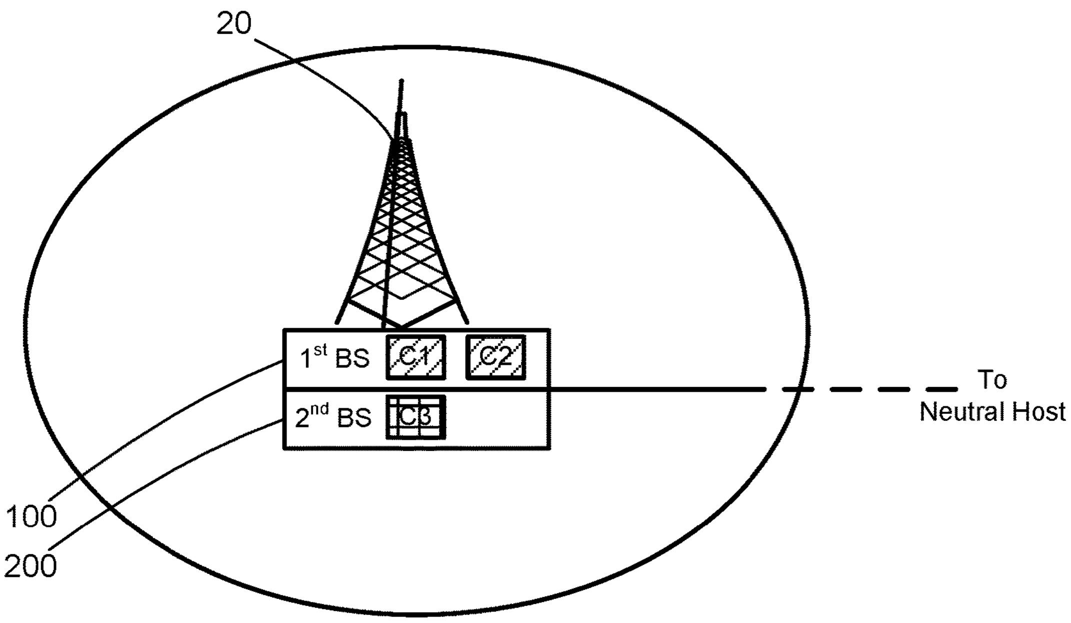
FIG. 3 is a schematic diagram of the cellular telecommunications network of FIG. 2, in a second configuration.
Figure 4:
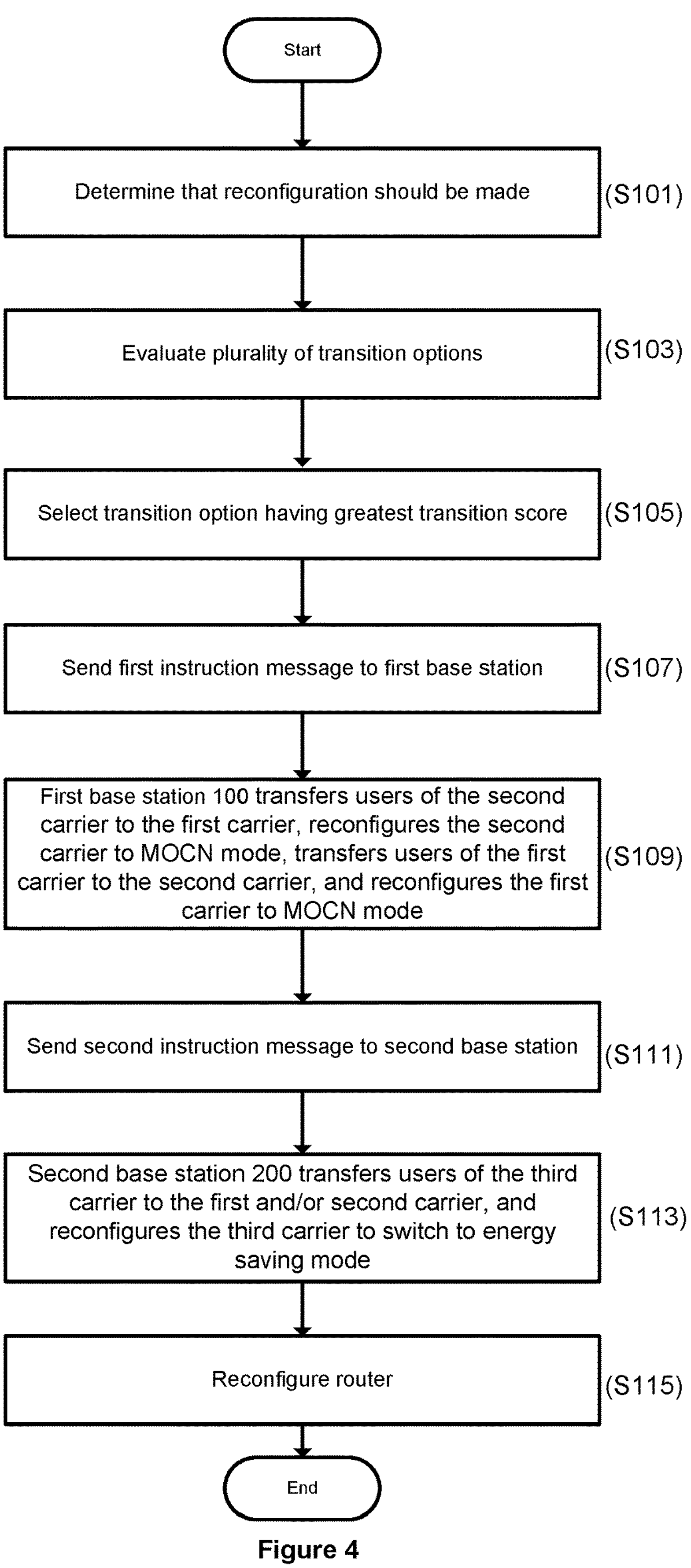
FIG. 4 is a flow diagram illustrating the first embodiment of the method of the present disclosure.

A final state of the network is shown in FIG. 3.

This first embodiment therefore provides a process for reconfiguring the second base station 200 which reduces service interruption to users by utilizing a neighboring multi-carrier base station, despite the neighboring multi-carrier base station being operated by another mobile network operator. Furthermore, this first embodiment evaluates a plurality of transition options so as to minimize any negative impacts on service that may occur during the transition.

In the embodiment above, the trigger for reconfiguring the third base station is an energy saving trigger so as to switch the third base station to energy saving mode. However, any form of trigger that may cause service interruption may be used instead. Typically, such service interruption results from any reconfiguration that requires a base station reboot (otherwise known as a power cycle). In an alternative example in which the second base station 200 reconfigures and becomes operational soon after the transfer of users to the first base station 100, users may be transferred back to the second base station 200 again. In this alternative example, it may not be necessary to reconfigure one or both carriers of the first base station 100 to MOCN mode. That is, a suitable transition option may involve the following steps:

a) Transfer users of the first carrier of the first base station 100 to the second carrier of the first base station 100, b) Reconfigure the second carrier of the first base station 100 so as to communicate with users of the second MNO (i.e. and not the first MNO), c) Transfer users of the second base station 200 to the second carrier of the first base station 100, d) Reconfigure the second base station (e.g. reboot), e) Transfer users of the second carrier of the first base station 100 back to the second base station 200, f) Reconfigure the second carrier of the first base station 100 so as to communicate with users of the first MNO.

Accordingly, the switch to MOCN mode for at least one carrier is non-essential. However, it allows the first base station 100 to balance load by transferring users between its multiple carriers, which may result in fewer failed handovers and/or better QoS for users, thus resulting in a greater transition score.

The skilled person will understand that it is non-essential that all users are transferred between carriers in the transition steps. That is, a subset of users may not be transferred, and potentially experience poor or no service, and the negative impact of this may be considered as part of the transition score. Accordingly, many further transition options may be evaluated in which subset of users are transferred between carriers and carriers are switched between modes of operation (e.g. normal to energy saving, or MORAN to MOCN).

The skilled person will also understand that the disclosure is not limited to a first multi-carrier base station and a second base station. That is, any transition option which involves at least three carriers (in which a first carrier is part of a reconfiguration event, and a second and third carriers are used during the transition) may be used. These at least three carriers may or may not be part of the same operator, may or may not be part of the same base station, and may or may not be part of the same cell site.

Furthermore, any transition option which involves two carriers in a multi-operator scenario (i.e. a first carrier for a first MNO and a second carrier for a second MNO) may be used. In this scenario, where the neutral host controller 42 determines that a reconfiguration should be made to the second base carrier, the transition options may be:

1. Option 1:
    a. First carrier switches to MOCN mode (disconnecting all of its users during this reconfiguration),
    b. Second carrier transfers users to the first carrier,
    c. Second carrier reconfigures (e.g. switch to energy saving mode).
2. Option 2:
    a. Second carrier switches to MOCN mode (disconnecting all of its users during this reconfiguration),
    b. First carrier transfers users to the second carrier,
    c. First carrier switches to MOCN mode,
    d. Second carrier transfers users to first carrier,
    e. Second carrier reconfigures (e.g. switch to energy saving mode).

These options differ in the negative impact to users of either the first or second carrier (i.e. in option 1, users of the first carrier suffer more than users of the second carrier). However, the transition score may depend on the relative importance of service impact for different MNOs and/or the number of users being impacted.

In the above embodiment, the compensation base station switches to MOCN mode so as to provide service to an energy saving base station of another MNO. The skilled person will understand that this is non-essential, and the energy saving base station and compensation base station may be of the same MNO. Furthermore, when the compensation base station and energy saving base stations are of different MNOs, the switch to MOCN mode may be based on the compensation base station using (at least a part of) its own exclusive licensed spectrum for that other MNO (e.g. by using the other MVO's PLMN). However, other options are available, such as by using shared licensed spectrum or unlicensed spectrum.

The skilled person will also understand that the above embodiment is applicable to a scenario where a base station needs to reconfigure to transition from energy saving mode to normal (active) mode.

The skilled person will also understand that it is non-essential for the neutral host controller 42 to determine that a trigger condition for the reconfiguration has been met. The base station may determine that this condition has been met, and inform the neutral host controller 42 of this determination.

The skilled person will also understand that it is non-essential for the various processes described above to be performed on the neutral host controller. That is, any entity in the cellular telecommunications network could implement the above processes, and would typically be supported by a sharing arrangement between the operators.

The above embodiment uses a transition scoring system to identify the most suitable transition. The transition score may also include a 'cell reselection term', which represents the negative impact to (inactive) users that undergo a cell reselection process following the change in carrier. The transition score may also include a factor based on the time of a switch to energy saving mode, such that transition options with relatively early switches to energy saving mode receive a more positive score. Furthermore, the skilled person will understand that the transition scoring system is non-essential, and that any suitable method of identifying a transition option that reduces a negative impact on users when a carrier or base station is being reconfigured may be used.

The skilled person will understand that any combination of features is possible within the scope of the disclosure, as claimed.

The invention claimed is:

1. A method in a cellular telecommunications network, the cellular telecommunications network including a first transceiver providing a first access connection in a first spectrum range, and a second transceiver providing a second access connection in a second spectrum range, the method comprising:
- determining that a trigger condition for reconfiguring the second transceiver has been met; and, in response,
- evaluating a plurality of candidate transition options, wherein each candidate transition option includes:
  - transferring users from the second spectrum range to the first access connection, and
  - following the transferring of the users from the second spectrum range to the first access connection, reconfiguring the second transceiver, wherein the evaluating is based on a user impact of a transition;
- selecting a transition option from the plurality of candidate transition options based on the evaluating;
- causing a transfer of users from the second spectrum range according to the selected transition option; and
- causing the reconfiguration of the second transceiver according to the selected transition option.

2. The method as claimed in claim 1, wherein the first access connection is for a first mobile network operator and the second access connection is for a second mobile network operator, and at least one of the plurality of candidate transition options further includes:
- reconfiguring the first access connection so that the first spectrum range is for the first mobile network operator and the second mobile network operator, and
- following the reconfiguring of the first access connection so that the first spectrum range is for the first mobile network operator and the second mobile network operator, transferring users from the second spectrum range to the first spectrum range.

3. The method as claimed in claim 1, wherein the first access connection further includes a third spectrum range, and at least one of the plurality of candidate transition options includes:
- transferring users from the third spectrum range to the first spectrum range, and
- following the transferring of the users from the third spectrum range to the first spectrum range, transferring users from the second spectrum range to the first access connection.

4. The method as claimed in claim 3, wherein the first spectrum range and the third spectrum range are for a first mobile network operator, and the second spectrum range is for a second mobile network operator, and transferring of the users from the third spectrum range to the first spectrum range includes:
- transferring the users from the third spectrum range to the first spectrum range, and
- following the transferring of the users from the third spectrum range to the first spectrum range, reconfiguring the first access connection so that the third spectrum range is for the second mobile network operator; and
- transferring users from the second spectrum range to the first access connection includes transferring users from the second spectrum range to the third spectrum range of the first access connection.

5. The method as claimed in claim 4, wherein reconfiguring the first access connection includes reconfiguring the first access connection so that the third spectrum range is for both the first mobile network operator and the second mobile network operator, and transferring users from the second spectrum range to the first access connection further includes:

following reconfiguring the first access connection so that the third spectrum range is for the second mobile network operator, transferring users from the first spectrum range to the third spectrum range, and following transferring users from the first spectrum range to the third spectrum range, reconfiguring the first access connection so that the first spectrum range is for both the first mobile network operator and the second mobile network operator, wherein transferring users from the second spectrum range to the first spectrum range includes transferring users from the second spectrum range to the first spectrum range and the third spectrum range of the first access connection.

6. The method as claimed in claim 4, wherein reconfiguring the first access connection so that the third spectrum range is for the second mobile network operator includes reconfiguring the first access connection so that the third spectrum range is for both the first mobile network operator and the second mobile network operator, and the method further comprises:

following reconfiguring the second transceiver, transferring users from the first spectrum range to the third spectrum range, following transferring users from the first spectrum range to the third spectrum range, reconfiguring the first access connection so that the first spectrum range is for both the first mobile network operator and second mobile network operator, and following reconfiguring the first access connection so that the first spectrum range is for both the first mobile network operator and second mobile network operator, transferring a subset of users from the third spectrum range to the first spectrum range.

7. The method as claimed in claim 4, wherein reconfiguring the first access connection so that the third spectrum range is for the second mobile network operator includes reconfiguring the first access connection so that the third spectrum range is for both the first mobile network operator and the second mobile network operator, and the method further comprises:

following transferring users from the second spectrum range to the first access connection, reconfiguring the second access connection so that the second spectrum range is for the first mobile network operator and the second mobile network operator, following reconfiguring the second access connection so that the second spectrum range is for the first mobile network operator and the second mobile network operator, transferring users of the first spectrum range to the third spectrum range, following transferring users of the first spectrum range to the third spectrum range, reconfiguring the first access connection so that the first spectrum range is for both the first mobile network operator and the second mobile network operator, following reconfiguring the first access connection so that the first spectrum range is for both the first mobile network operator and the second mobile network operator, transferring a subset of users from the third spectrum range to the first spectrum range, and following transferring a subset of users from the third spectrum range to the first spectrum range, transferring users of the second spectrum range to at least one of the first spectrum range or the third spectrum range.

8. The method as claimed in claim 1, wherein the trigger condition is that the second transceiver is to enter an energy saving mode.

9. A non-transitory computer-readable storage medium storing a computer program comprising instructions which, when the computer program is executed by a computer, cause the computer, in a cellular telecommunications network including a first transceiver providing a first access connection in a first spectrum range, and a second transceiver providing a second access connection in a second spectrum range, to:

determine that a trigger condition for reconfiguring the second transceiver has been met; and, in response, evaluate a plurality of candidate transition options, wherein each candidate transition option includes:

transferring users from the second spectrum range to the first access connection, and following the transferring of the users from the second spectrum range to the first access connection, reconfiguring the second transceiver, wherein the evaluating is based on a user impact of a transition;

select a transition option from the plurality of candidate transition options based on the evaluating;

cause a transfer of users from the second spectrum range according to the selected transition option; and cause the reconfiguration of the second transceiver according to the selected transition option.

10. A system comprising:

at least one processor and memory configured, in a cellular telecommunications network including a first transceiver providing a first access connection in a first spectrum range, and a second transceiver providing a second access connection in a second spectrum range, to:

determine that a trigger condition for reconfiguring the second transceiver has been met; and, in response, evaluate a plurality of candidate transition options, wherein each candidate transition option includes:

transferring users from the second spectrum range to the first access connection, and following the transferring of the users from the second spectrum range to the first access connection, reconfiguring the second transceiver, wherein the evaluating is based on a user impact of a transition;

select a transition option from the plurality of candidate transition options based on the evaluating;

cause a transfer of users from the second spectrum range according to the selected transition option; and cause the reconfiguration of the second transceiver according to the selected transition option.

11. The system of claim 10, wherein the system is a network node.

* * * * *